United States Patent
Jessen et al.

(10) Patent No.: US 9,383,955 B2
(45) Date of Patent: Jul. 5, 2016

(54) MECHANISM FOR AUTOMATICALLY DISABLING PRINTER SEPARATOR PAGES

(71) Applicants: Robert F. Jessen, Berthoud, CO (US); Mary G. Cochran, Lafayette, CO (US); Marius Stefan, Hunedoara (RO); Lucian Ioan Olariu, Giroc (RO); Silviu Nanau, Giroc (RO)

(72) Inventors: Robert F. Jessen, Berthoud, CO (US); Mary G. Cochran, Lafayette, CO (US); Marius Stefan, Hunedoara (RO); Lucian Ioan Olariu, Giroc (RO); Silviu Nanau, Giroc (RO)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/861,014

(22) Filed: Sep. 22, 2015

(65) Prior Publication Data
US 2016/0011832 A1    Jan. 14, 2016

Related U.S. Application Data

(62) Division of application No. 14/318,950, filed on Jun. 30, 2014, now Pat. No. 9,170,761, which is a division of application No. 12/954,515, filed on Nov. 24, 2010, now abandoned.

(51) Int. Cl.
*G06F 3/12* (2006.01)
*G06K 15/02* (2006.01)
*G06K 15/00* (2006.01)

(52) U.S. Cl.
CPC ............ *G06F 3/1252* (2013.01); *G06F 3/1219* (2013.01); *G06F 3/1222* (2013.01); *G06F 3/1238* (2013.01); *G06F 3/1254* (2013.01); *G06F 3/1285* (2013.01); *G06K 15/1809* (2013.01); *G06K 15/1822* (2013.01); *G06K 15/4095* (2013.01); *G06F 2219/10* (2013.01); *G06K 2215/0011* (2013.01); *G06K 2215/0017* (2013.01)

(58) Field of Classification Search
None
See application file for complete search history.

(56) References Cited

U.S. PATENT DOCUMENTS

| | | | |
|---|---|---|---|
| 5,559,933 | A | 9/1996 | Boswell |
| 6,373,588 | B1 | 4/2002 | Fischer et al. |
| 7,684,064 | B2 | 3/2010 | Kimura et al. |
| 2009/0213403 | A1 | 8/2009 | Sojian |
| 2009/0244585 | A1 | 10/2009 | Mitsui |
| 2009/0290186 | A1 | 11/2009 | Rocas |

*Primary Examiner* — Marivelisse Santiago Cordero
*Assistant Examiner* — Moustapha Diaby
(74) *Attorney, Agent, or Firm* — Blakely, Sokoloff, Taylor & Zafman LLP

(57) ABSTRACT

A computer generated method disclosed. The method includes receiving a print job, analyzing the print job data stream, determining if the print job data stream includes a command matching one or more pre-defined criteria and disabling generation of a separator page for the print job if the print job data stream includes a command matching one or more pre-defined criteria.

15 Claims, 3 Drawing Sheets

MECHANISM FOR AUTOMATICALLY DISABLING PRINTER SEPARATOR PAGES

The present patent application is a Divisional application claiming priority from application Ser. No. 14/318,950, filed Jun. 30, 2014, pending, which claims priority from application Ser. No. 12/954,515, filed Nov. 24, 2010.

FIELD OF THE INVENTION

The invention relates to the field of printing systems. Particularly, the invention relates to generation of print job separator pages.

BACKGROUND

Computing centers that employ one or more printers to serve a group of users, such as a networked group or other work group, typically rely on the printers to batch process print jobs (e.g., print-out a series of different print jobs in succession). Such printers produce separator pages which are used for identification and segregation of print jobs in an office, departmental or other shared or multi-user printing environment. Separator pages generated at the beginning of a print job are commonly referred to as headers, while pages generated after a print job are referred to as trailers. Such separator pages include one or two lines of text that identify the requesting party and identify the job number.

Generation of separator pages at a printer is commonly established as a default setting. Thus, a default application setting of adding separator pages applies to both secure and non-secure print jobs. However, because a user is often required to physically go to the printer panel and input a security number (PIN) in order to print secured document(s) there is no need for identification of the print job via a separator page. Accordingly, printing separator pages in such instances results in wasted paper. Wasted paper attributed to the generation of unnecessary separator pages may lead to thousands of dollars wasted every year by businesses using printers. There are additional instances in which separator pages are not needed, but are generated nonetheless.

Accordingly, a mechanism to disable the generation of separator pages is desired.

SUMMARY

In one embodiment a computer generated method is disclosed. The method includes receiving a print job, analyzing the print job data stream, determining if the print job data stream includes a command matching one or more pre-defined criteria and disabling generation of a separator page for the print job if the print job data stream includes a command matching one or more pre-defined criteria.

In another embodiment, a print server is disclosed. The print server includes a printing software product to receive a print job, analyze the print job data stream, determine if the print job data stream includes a command matching one or more pre-defined criteria and disable generation of a separator page for the print job if the print job data stream includes a command matching one or more pre-defined criteria.

BRIEF DESCRIPTION OF THE DRAWINGS

A better understanding of the present invention can be obtained from the following detailed description in conjunction with the following drawings, in which.

DETAILED DESCRIPTION

A mechanism to disable the generation of separator pages for various types of print jobs is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
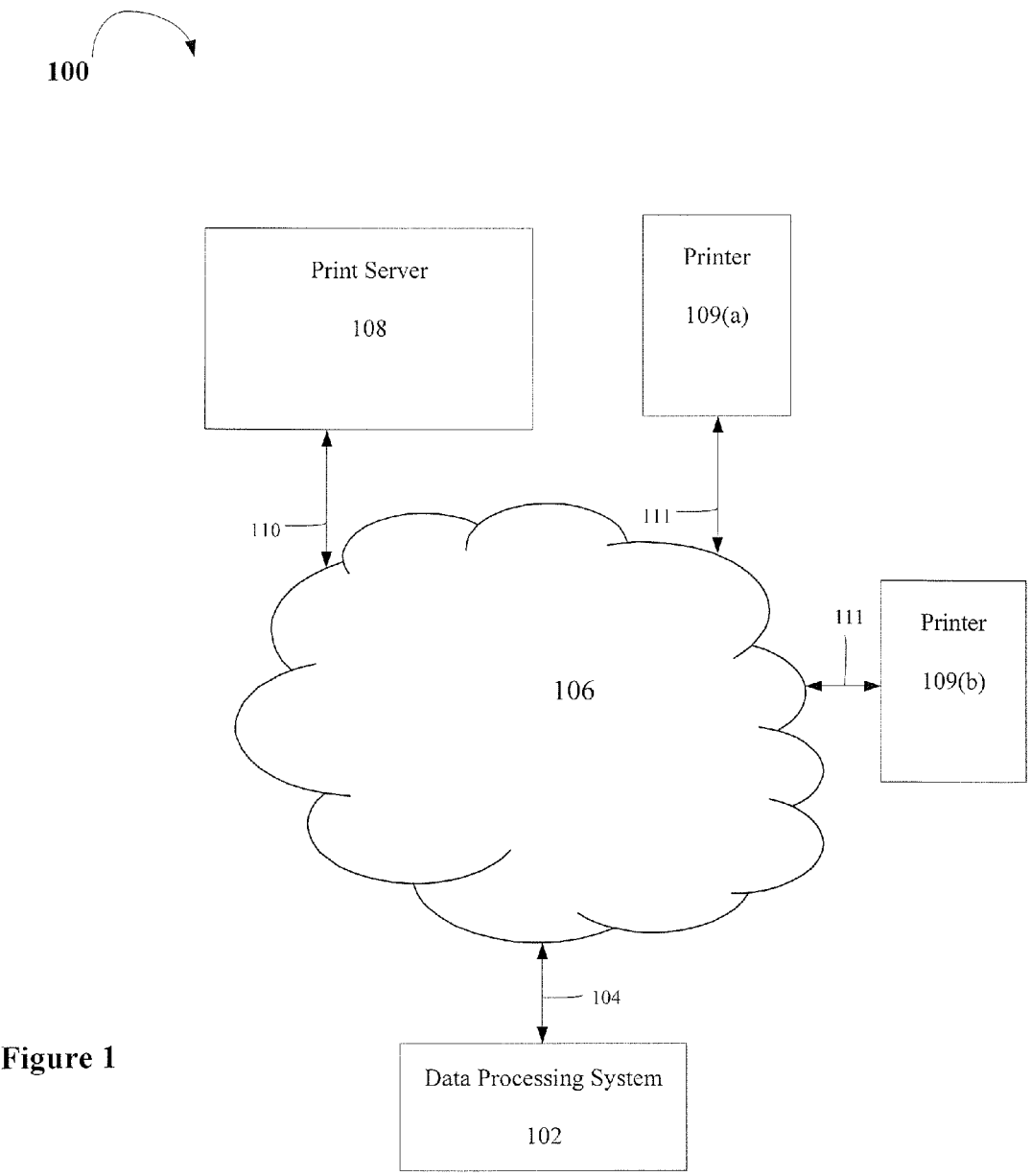
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system, or other operating system, and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 100 includes a print server 108 that serves print requests over network 106 received via communications link 110 between print server 108 and network 106. Print server 108 subsequently transmits the print requests via communications link 110 to one of printers 109 for printing, which are coupled to network 106 via communications links 111.

In one embodiment, a print application at data processing system 102 allows a user to select the desired print server 108 and submit requests for service requests to printer 109 via print server 108 over network 106 Although described as separate entities, other embodiments may include print server 108 being incorporated in one or more of the printers 109. In yet further embodiments, the print server and printer may be physically separate entities. Therefore, the data processing system network depicted in FIG. 1 is selected for the purposes of explaining and illustrating the present invention and is not intended to imply architectural limitations. Those skilled in the art will recognize that various additional components may be utilized in conjunction with the present invention.

According to one embodiment, print server 108 implements a printing software product that manages the printing of documents from data processing system 102 and one or more of printers 109. In other embodiments, the printing software product manages printing of documents from multiple data processing systems 102 to the one or more printers 109. In a further embodiment, the printing software product may be implemented using either InfoPrint Manager (IPM) or InfoPrint ProcessDirector (IPPD), although other types of printing software may be used instead.

In one embodiment, the printing software product analyzes a print job data stream against criteria to determine if a separator page is to be generated for the print job. In one embodiment, criteria are algorithms or rules that define an action (e.g., enable/disable separator pages) upon a data stream matching the criteria (e.g., commands present within the data stream that indicate that the print job is a secure print job). For instance, the commands may include PJL commands, such as @PJL SET HOLD=OFF/ON/PROOF/STORE/PRINT, @PJL SET HOLDTYPE=PUBLIC/PRIVATE and @PJL SET HOLDKEY=4 digits PIN, 000, 1234, . . . 999. However, other embodiments may implement PostScript or other proprietary commands). The criteria are pre-defined before a print job is received and may be modified as desired, and may include rules that act on one or more variables.

In one embodiment, the printing software product searches for and detects the presence of specific print job requests by parsing print job command line arguments and matching them to known commands. In such an embodiment the known commands indicating that the job is a secure print job may be printer driver flags (e.g., qprt-P 'queue'-U2 -V1234 printfile, where -U flag enables the secure print request and -V flag controls the security number). Other embodiments may define and implement other specific printing software flags or parameters.

Secure command line arguments within a print job instruct the printer to hold the job at the printer with a PIN number that the user must enter to release it. According to one embodiment, secure print jobs are submitted by using command line specific parameters. In such an embodiment, the printing software product inserts the proper secure commands into the data stream in response to secure print request commands (e.g., qprt-P 'queue'-U2 -V1234 printfile). Another embodiment for submitting secure print jobs is to have the secure commands inserted in the data stream (e.g., PJL SET HOLD=ON; @PJL SET HOLDTYPE=PRIVATE, @PJL SET HOLDKEY="1234") prior to receipt at the printing software product.

In either embodiment, the printing software product parses the command line arguments to identify if secure job options were used. According to one embodiment, the printing software product processes the print job as secure, while automatically disabling the generation of a separator job for a print job upon detecting secure command line argument. Thus, no separator page is requested by the printing software product when the job is printed at a printer 109. As a result, non-secure jobs are printed with separator pages, while secure jobs are not.

In another embodiment, the printing software product searches for commands within the data stream that indicate that the print job is to be forwarded to a particular output bin. In such an embodiment, the criteria are set so that print jobs that are specified for a particular mailbox have the separator page withheld. However, print jobs that specify a general output bin at the same printer may have the separator page added. This embodiment may be implemented where the printer administrator has determined that print job outputs in the mailbox do not require a header/trailer page.

In yet another embodiment, the printing software product searches for commands within the data stream that indicate that the print job is to undergo post-processing. For example, the criteria may be set such that print jobs that are specified for post-processing (e.g., stapling or folding) have the separator page withheld. However, print jobs at the same printer that do not specify post-processing have the separator page added. This embodiment may be implemented where the print job administrator has determined that print job outputs for post-processing do not require a separator page because they are easily identified by the stapling.

One skilled in the art will recognize that various other embodiments may implement additional criteria as an impetus for the automatic disabling of separator pages.

Figure 2:
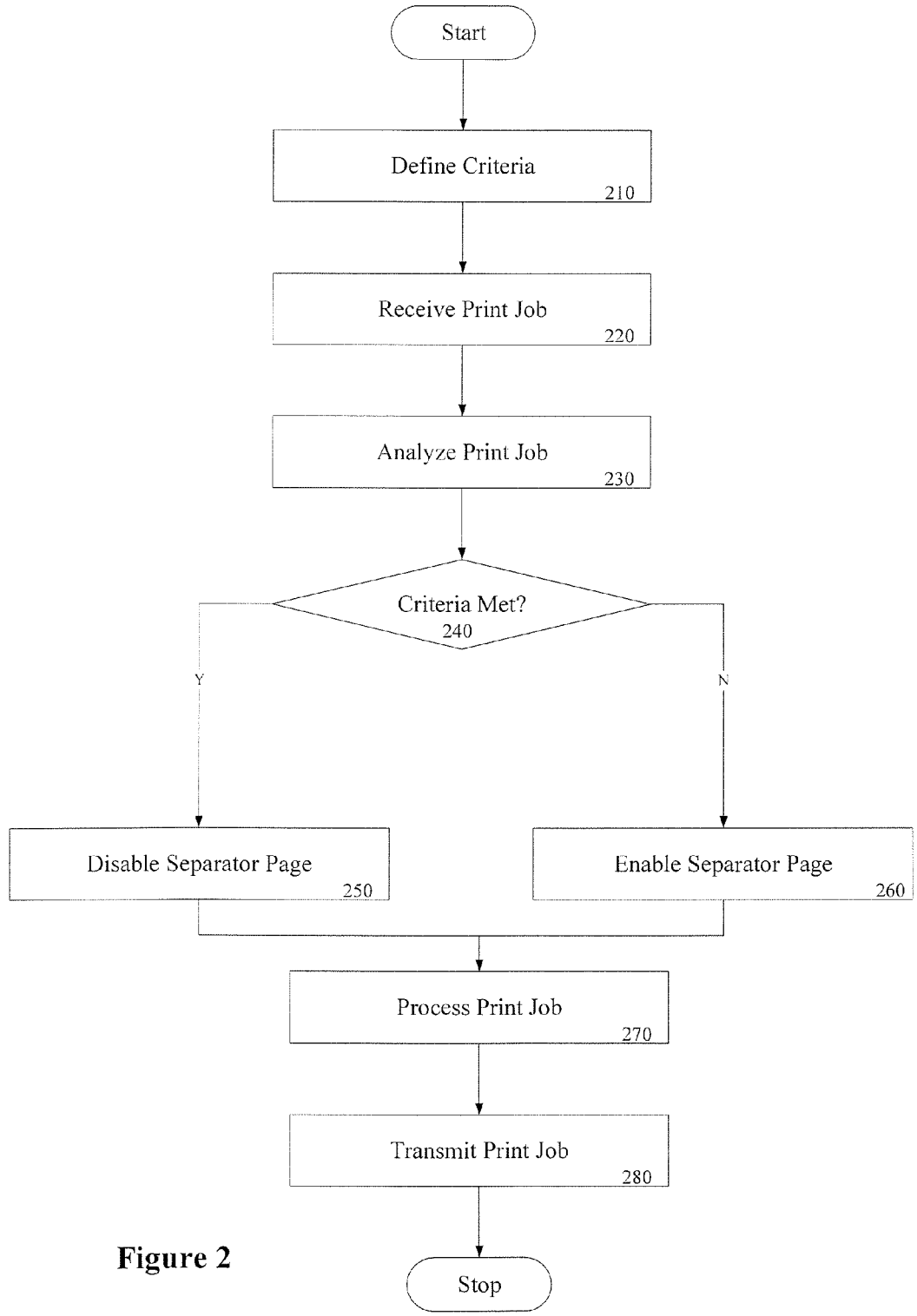
FIG. 2 is a flow diagram illustrating one embodiment of automatically disabling generation of a separator page.

FIG. 2 is a flow diagram illustrating one embodiment of automatically disabling generation of a separator page. At processing block 210, the criteria are set for which a print job data stream is compared to determine if a separator page is to be generated. At processing block 220, a print job data stream is received at the printing software product. At processing block 230, the print job data stream is analyzed. At decision block 240, it is determined whether the data stream includes commands that meet the criteria.

If one or more criteria are met the printing software product prevents a separator page from being printed for the print job by not inserting the command lines into the data stream that generate the separator page, processing block 250. If, however, none of the criteria are met the printing software product enables generation of the separator page by inserting the command lines into the data stream, processing block 260.

In one embodiment, the printing software product generates separator pages by default. Thus, no action is warranted to initiate generation of separator pages. However other embodiments may feature non-generation of separator pages as the default setting, where separator pages are generated if the criteria are not met. In either event, the print job data stream undergoes further processing at the printing software product, processing block 270. At processing block 280, the print job is transmitted to a print engine for printing.

Figure 3:
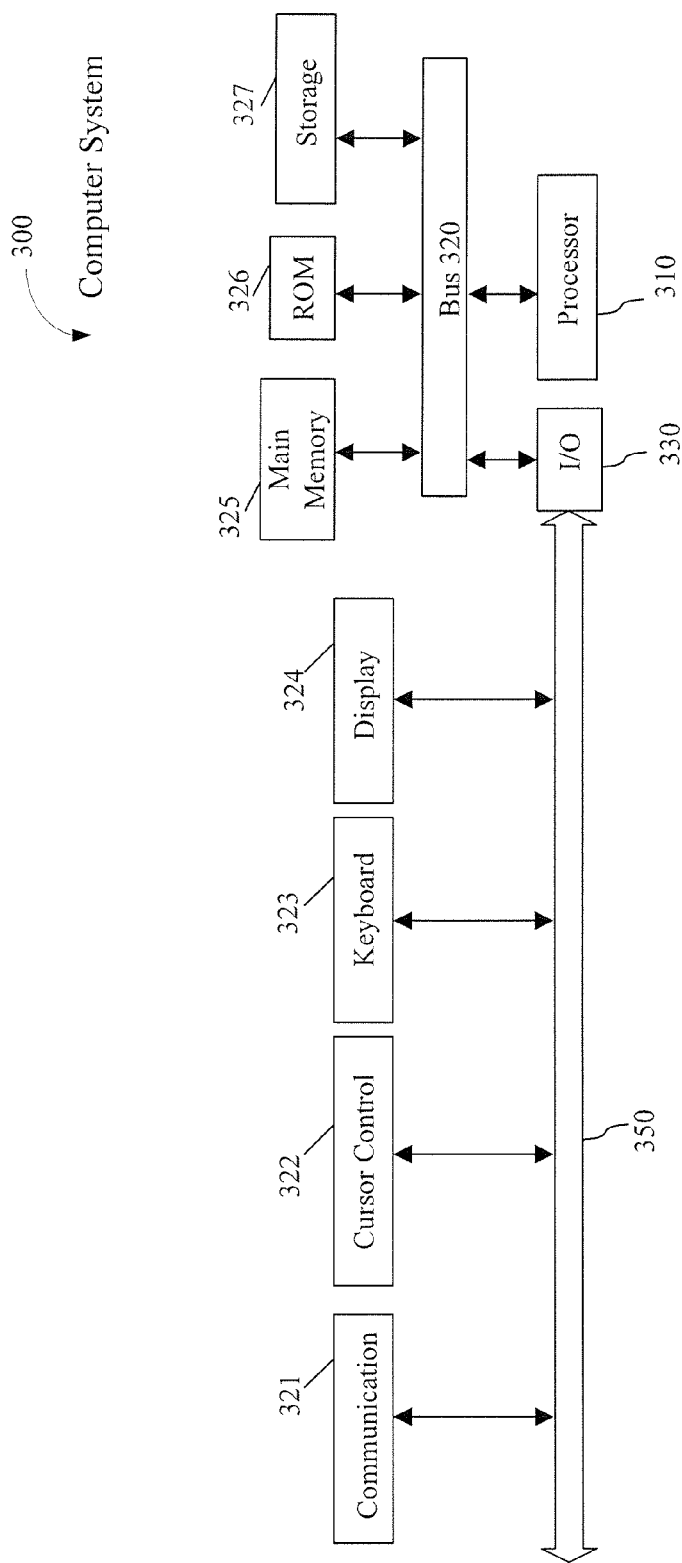
FIG. 3 illustrates one embodiment of a computer system.

FIG. 3 illustrates a computer system 300 on which data processing system 102 and/or server 108 may be implemented. Computer system 300 includes a system bus 320 for communicating information, and a processor 310 coupled to bus 320 for processing information.

Computer system 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Computer system 300 also may include a read only memory (ROM) and or other static storage device 326 coupled to bus 320 for storing static information and instructions used by processor 310.

A data storage device 325 such as a magnetic disk or optical disc and its corresponding drive may also be coupled to computer system 300 for storing information and instructions. Computer system 300 can also be coupled to a second I/O bus 350 via an I/O interface 330. A plurality of I/O devices may be coupled to I/O bus 350, including a display device 324, an input device (e.g., an alphanumeric input device 323 and or a cursor control device 322). The communication device 321 is for accessing other computers (servers or clients). The communication device 321 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A non-transitory machine-readable medium including data that, when accessed by a machine, cause the machine to: receive a print job; analyze the print job data stream; determine whether the print job data stream includes a command line argument matching one or more pre-defined criteria indicating that a print job is to be forwarded to a first output bin of a plurality of output bins at a printer, wherein the command line argument comprises a printer driver flag; and disable generation of a separator page for the print job upon determining that the print job data stream includes a command line argument indicating that the print job is to be forwarded to the first of the plurality of output bins at the printer.

2. The non-transitory machine-readable medium of claim 1 wherein the command line argument comprises a printer driver flag.

3. The non-transitory machine-readable medium of claim 1 including data that, when accessed by a machine, further cause the machine to: transmit the print job to a print engine; and printing the print job without a separator page.

4. The non-transitory machine-readable medium of claim 1 including data that, when accessed by a machine, further cause the machine to generate a separator page for the print job if the print job data stream does not include a command indicating that the print job is to be forwarded to a second of the plurality of output bins at the printer.

5. The non-transitory machine-readable medium of claim 4 including data that, when accessed by a machine, further cause the machine to: transmit the print job to a print engine; and print the print job with a separator page.

6. The print server of claim 1 wherein the command line argument comprises a printer driver flag.

7. A print server comprising:
a processor to receive a print job, analyze the print job data stream, determine whether the print job data stream includes a command line argument matching one or more pre-defined criteria indicating that a print job is to be forwarded to a first output bin of a plurality of output bins at a printer, and disable generation of a separator page for the print job upon determining that the print job data stream includes a command line argument indicating that the print job is to be forwarded to the first of the plurality of output bins at the printer, wherein the command line argument comprises a printer driver flag.

8. The print server of claim 7 wherein the processor transmits the print job to a print engine and prints the print job without a separator page.

9. The print server of claim 7 wherein the processor generates a separator page for the print job if the print job data stream does not include a command indicating that the print job is to be forwarded to a second of the plurality of output bins at the printer.

10. The print server of claim 9 wherein the processor transmits the print job to a print engine and prints the print job with a separator page.

11. A computer generated method comprising:
receiving a print job;
analyzing the print job data stream;
determining whether the print job data stream includes a command line argument matching one or more pre-defined criteria indicating that a print job is to be forwarded to a first output bin of a plurality of output bins at a printer, wherein the command line argument comprises a printer driver flag; and
disabling generation of a separator page for the print job upon determining that the print job data stream includes a command line argument indicating that the print job is to be forwarded to the first of the plurality of output bins at the printer.

12. The method of claim 11 wherein the command line argument comprises a printer driver flag.

13. The method of claim 11 further comprising:
transmitting the print job to a print engine; and
printing the print job without a separator page.

14. The method of claim 13 further comprising generating a separator page for the print job if the print job data stream does not include a command indicating that the print job is to undergo post-processing.

15. The method of claim 14 further comprising:
transmitting the print job to a print engine; and
printing the print job with a separator page.

* * * * *